(12) United States Patent
Sawada et al.

(10) Patent No.: US 10,734,159 B2
(45) Date of Patent: Aug. 4, 2020

(54) MULTILAYER CERAMIC CAPACITOR AND METHOD FOR MANUFACTURING MULTILAYER CERAMIC CAPACITOR

(71) Applicant: Murata Manufacturing Co., Ltd., Nagaokakyo-shi, Kyoto-fu (JP)

(72) Inventors: Takashi Sawada, Nagaokakyo (JP); Yoshinao Nishioka, Nagaokakyo (JP); Kenichi Togo, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 15/850,114

(22) Filed: Dec. 21, 2017

(65) Prior Publication Data
US 2018/0182552 A1 Jun. 28, 2018

(30) Foreign Application Priority Data

Dec. 22, 2016 (JP) ................................. 2016-249623
Sep. 14, 2017 (JP) ................................. 2017-176815

(51) Int. Cl.
*H01G 4/232* (2006.01)
*H01G 4/12* (2006.01)
(Continued)

(52) U.S. Cl.
CPC ............ *H01G 4/2325* (2013.01); *H01G 4/12* (2013.01); *H01G 4/30* (2013.01); *H01G 4/008* (2013.01);
(Continued)

(58) Field of Classification Search
CPC ........... H01G 4/30; H01G 4/228; H01G 4/232
See application file for complete search history.

(56) References Cited

U.S. PATENT DOCUMENTS

| | | | |
|---|---|---|---|
| 6,525,628 B1 * | 2/2003 | Ritter ..................... | H01C 13/02 333/172 |
| 2004/0042155 A1 * | 3/2004 | Ritter ................... | H01G 4/2325 361/309 |

(Continued)

FOREIGN PATENT DOCUMENTS

| | | | |
|---|---|---|---|
| JP | 2000058376 A | * | 2/2000 |
| JP | 2004-047983 A | | 2/2004 |

(Continued)

OTHER PUBLICATIONS

Official Communication issued in corresponding Korean Patent Application No. 10-2017-0175988, dated Feb. 19, 2019.
(Continued)

*Primary Examiner* — Eric W Thomas
(74) *Attorney, Agent, or Firm* — Keating & Bennett, LLP (57) ABSTRACT

A multilayer ceramic capacitor includes a substantially cuboid laminated body including ceramic layers and internal electrode layers laminated, and two or more exposed regions where the plurality of internal electrode layers are exposed, and external electrodes, wherein at least one of the external electrodes is an external electrode with resistance, the internal electrode layers include a first internal electrode layer and a second internal electrode layer opposed to the first internal electrode layer in the lamination direction, and the external electrode with resistance includes a thin film electrode layer in direct contact with the internal electrode layer in the exposed region, a resistive electrode layer provided on the thin film electrode layer, and an upper electrode layer provided on the resistive electrode layer, which has a lower electrical resistivity lower than the resistive electrode layer.

13 Claims, 4 Drawing Sheets

(51) Int. Cl.
*H01G 4/30* (2006.01)
*H01G 4/008* (2006.01)
(52) U.S. Cl.
CPC ......... *H01G 4/1227* (2013.01); *H01G 4/1236* (2013.01)

(56) References Cited

U.S. PATENT DOCUMENTS

| | | | | |
|---|---|---|---|---|
| 2005/0012200 | A1* | 1/2005 | Sawada | H01G 4/2325 257/698 |
| 2008/0128860 | A1* | 6/2008 | Sawada | H01G 4/232 257/536 |
| 2014/0098454 | A1* | 4/2014 | Kwag | H01G 4/2325 361/301.4 |

FOREIGN PATENT DOCUMENTS

| | | | |
|---|---|---|---|
| JP | 2004-128328 | A | 4/2004 |
| JP | 2004-259820 | A | 9/2004 |
| JP | 2004259735 | A * | 9/2004 |
| JP | 2008-130770 | A | 6/2008 |
| JP | 2008-159965 | A | 7/2008 |
| JP | 2014-096541 | A | 5/2014 |
| JP | 2015-026861 | A | 2/2015 |
| JP | 2016-127262 | A | 7/2016 |

OTHER PUBLICATIONS

Official Communication issued in Japanese Patent Application No. 2017-176815, dated Jan. 21, 2020.

* cited by examiner

LT CROSS SECTION

LT CROSS SECTION

MULTILAYER CERAMIC CAPACITOR AND METHOD FOR MANUFACTURING MULTILAYER CERAMIC CAPACITOR

CROSS REFERENCE TO RELATED APPLICATIONS

This application claims the benefit of priority to Japanese Patent Application No. 2016-249623 filed on Dec. 22, 2016 and Japanese Patent Application No. 2017-176815 filed on Sep. 14, 2017. The entire contents of these applications are hereby incorporated herein by reference.

BACKGROUND OF THE INVENTION

1. Field of the Invention

The present invention relates to a multilayer ceramic capacitor and a method for manufacturing a multilayer ceramic capacitor.

2. Description of the Related Art

Multilayer ceramic capacitors are low in equivalent series resistance (ESR), and there are thus cases of exceeding the impedance as a reference for the circuits in resonance in high frequency ranges. For that reason, as high-frequency multilayer ceramic capacitors, there are multilayer ceramic capacitors with resistors connected thereto (also referred to as capacitors with resistance). The capacitors with resistance include, for example, a multilayer ceramic capacitor including an external terminal electrode electrically connected to an internal electrode layer, where a first conductive layer including a conductive material and glass, which functions as a resistive electrode layer, is formed directly on the surface of an element main body including dielectric layers (also referred to as ceramic layers) and internal electrode layers alternately laminated, and a second conductive layer including a metal and glass is formed on the surface of the first conductive layer (for example, Japanese Patent Application Laid-Open No. 2004-128328).

However, the multilayer ceramic capacitor described in Japanese Patent Application Laid-Open No. 2004-128328 has a problem in that the connectivity is not stabilized between the internal electrode layer of the element main body and the external electrode. The cause therefor is believed to be due to the presence of irregularities at the surface of the internal electrode layer exposed at the surface of the element main body.

For the multilayer ceramic capacitor described in Japanese Patent Application Laid-Open No. 2004-128328, the first conductive layer, which functions as a resistive electrode layer, is formed by applying a paste for the first conductive layer to the surface of the element main body and applying a heat treatment to the paste. However, there are irregularities at the surface of the internal electrode layer in contact with the first conductive layer. The first conductive layer formed by applying the heat treatment to the paste for the first conductive layer has an insufficient ability to follow the irregularities at the surface of the internal electrode layer. Thus, the adhesion varies between the first conductive layer made using the paste for the first conductive layer and the internal electrode layer of the element main body, thus leading to a failure to stabilize the connectivity therebetween.

In addition, the electrode formed by baking the conductive paste sometimes varies in contact with the internal electrode layer, under the influence of components other than the conductive component, included in the conductive paste. The first conductive layer functions as a resistive electrode layer, but when a low-resistance region is partially formed due to the variation in contact between the internal electrode layer and the first conductive layer, there is a problem in that current is concentrated on the region, thus making it difficult to control the resistance value of the whole ceramic capacitor.

SUMMARY OF THE INVENTION

Preferred embodiments of the present invention provide multilayer ceramic capacitors which provide stable connectivity between an internal electrode layer and an external electrode.

A multilayer ceramic capacitor according to a preferred embodiment of the present invention includes a substantially cuboid laminated body including a plurality of ceramic layers and a plurality of internal electrode layers that are laminated, and including two or more exposed regions at which the plurality of internal electrode layers are exposed; and external electrodes which cover the exposed regions, wherein at least one of the external electrodes is an external electrode with resistance, the internal electrode layers include a first internal electrode layer and a second internal electrode layer opposed to the first internal electrode layer in the lamination direction, and the external electrode with resistance includes a thin film electrode layer in direct contact with the internal electrode layer in the exposed region, a resistive electrode layer provided on the thin film electrode layer, and an upper electrode layer provided on the resistive electrode layer, which has lower electrical resistivity than the resistive electrode layer.

In a multilayer ceramic capacitor according to a preferred embodiment of the present invention, the thin film electrode layer is preferably disposed in a plane in which the exposed region is provided at the laminated body.

In a multilayer ceramic capacitor according to a preferred embodiment of the present invention, the resistive electrode layer is preferably disposed in a plane in which the exposed region is provided at the laminated body.

In a multilayer ceramic capacitor according to a preferred embodiment of the present invention, preferably, the laminated body includes a first end surface, a second end surface opposed to the first end surface, a first side surface and a second side surface orthogonal or substantially orthogonal to the first end surface and the second end surface and opposed to each other, the first internal electrode layer is exposed at the first end surface and the second end surface, the second internal electrode layer is exposed at the first side surface and the second side surface, and the external electrode covering the exposed region where the first internal electrode layer is exposed on the first end surface and the second end surface defines the external electrode with resistance.

In a multilayer ceramic capacitor according to a preferred embodiment of the present invention, the external electrode covering the exposed region at which the second internal electrode layer is exposed on the first side surface and the second side surface defines a low-resistance external electrode.

In a multilayer ceramic capacitor according to a preferred embodiment of the present invention, the thin film electrode layer is preferably a plating electrode.

A method for manufacturing a multilayer ceramic capacitor according to a preferred embodiment of the present invention includes a laminated body forming step of forming a substantially cuboid laminated body including a plurality of ceramic layers and a plurality of internal electrode layers that are laminated, and including two or more exposed regions at which the plurality of internal electrode layers are exposed; and a covering step of covering the exposed regions with external electrodes, where the covering step includes a first coating step of covering at least one of the exposed regions with an external electrode with resistance including a thin film electrode layer, a resistive electrode layer provided on the thin film electrode layer, and an upper electrode layer provided on the resistive electrode layer, the upper electrode layer having a lower electrical resistivity than the resistive electrode layer, and in the first coating step, the thin film electrode layer is formed directly on the exposed internal electrode layer.

In a method for manufacturing a multilayer ceramic capacitor according to a preferred embodiment of the present invention, the thin film electrode layer is preferably formed by a plating method.

In a method for manufacturing a multilayer ceramic capacitor according to a preferred embodiment of the present invention, preferably, a first exposed region at which the first internal electrode layer of the internal electrode layers is exposed, and a second exposed region opposed to the first exposed region, and a third exposed region at which the second internal electrode layer of the internal electrodes is exposed, and a fourth exposed region opposed to the third exposed region are formed at the surface of the laminated body in the laminated body forming step, and the first coating step includes a step of forming the thin film electrode layer directly on the first internal electrode layer exposed in the first exposed region and the second exposed region, and the coating step further includes a second coating step of forming a low-resistance external electrode directly on the second internal electrode layer exposed in the third exposed region and the fourth exposed region.

It is to be noted that the order of the first coating step and the second coating step is not particularly limited.

In a method for manufacturing a multilayer ceramic capacitor according to a preferred embodiment of the present invention, preferably, the first coating step includes a first firing step of applying a resistive electrode paste onto the thin film electrode layer, and then firing the resistive electrode paste to form the resistive electrode layer, and a second firing step of applying an upper electrode paste onto the resistive electrode layer, and then firing the upper electrode paste to form the upper electrode layer, and the maximum temperature in the first firing step is higher than the maximum temperature in the second firing step.

In a method for manufacturing a multilayer ceramic capacitor according to a preferred embodiment of the present invention, preferably, the second coating step includes a third firing step of applying a low-resistance external electrode paste onto the second internal electrode layer exposed in the third exposed region and the fourth exposed region, and then firing the low-resistance external electrode paste.

In a method for manufacturing a multilayer ceramic capacitor according to a preferred embodiment of the present invention, the maximum temperature in the third firing step is higher than the maximum temperature in the first firing step.

According to preferred embodiments of the present invention, multilayer ceramic capacitors which provide stable connectivity between an internal electrode layer and an external electrode layer, and manufacturing methods therefor are provided.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 3A is a cross-sectional view schematically showing an example of an LT cross section of the multilayer ceramic capacitor shown in FIG. 2, whereas

DETAILED DESCRIPTION OF THE PREFERRED EMBODIMENTS

With reference to the drawings, multilayer ceramic capacitors according to preferred embodiments of the present invention and methods for manufacturing multilayer ceramic capacitors according to preferred embodiments of the present invention will be described below.

However, the present invention is not to be considered limited to the following configurations, and may be applied with changes appropriately made without changing or departing from the scope of the present invention. It is to be noted that the present invention also encompasses combinations of two or more individual preferable configurations according to the present invention as described below.

A multilayer ceramic capacitor including a laminated body and external electrodes according to a preferred embodiment of the present invention will be described as an example.

First, the laminated body and the external electrodes defining the multilayer ceramic capacitor according to a preferred embodiment of the present invention will be described with reference to FIG. 1 and FIG. 2.

Figure 1:
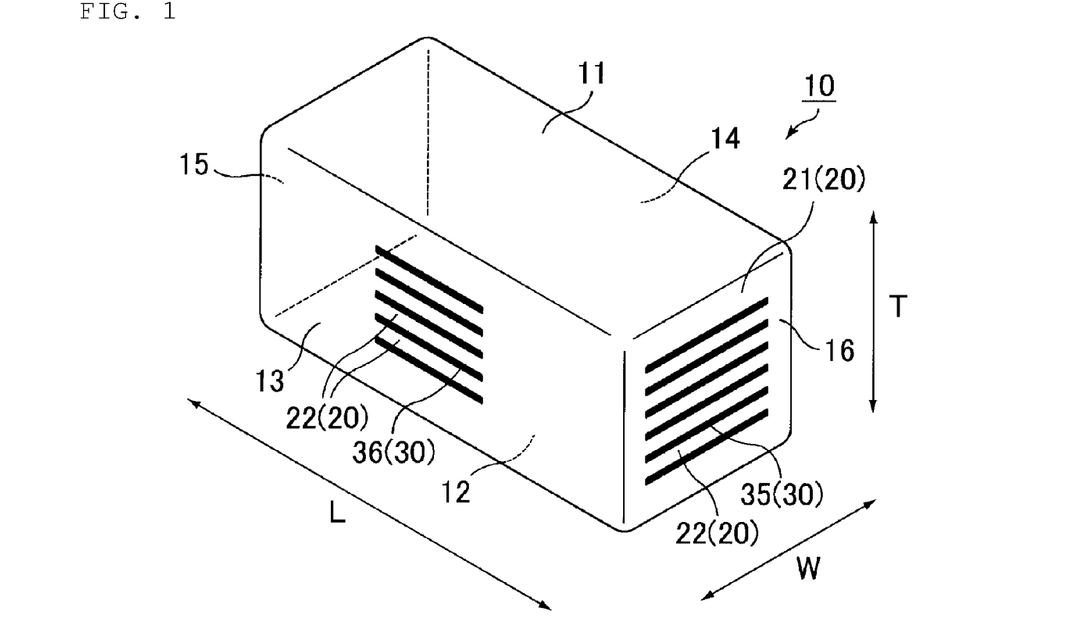
FIG. 1 is a perspective view schematically showing an example of a laminated body defining a multilayer ceramic capacitor according to a preferred embodiment of the present invention.

FIG. 1 is a perspective view schematically showing an example of the laminated body of a multilayer ceramic capacitor according to a preferred embodiment of the present invention. FIG. 2 is a perspective view schematically showing an example of the multilayer ceramic capacitor according to a preferred embodiment of the present invention.

Figure 2:
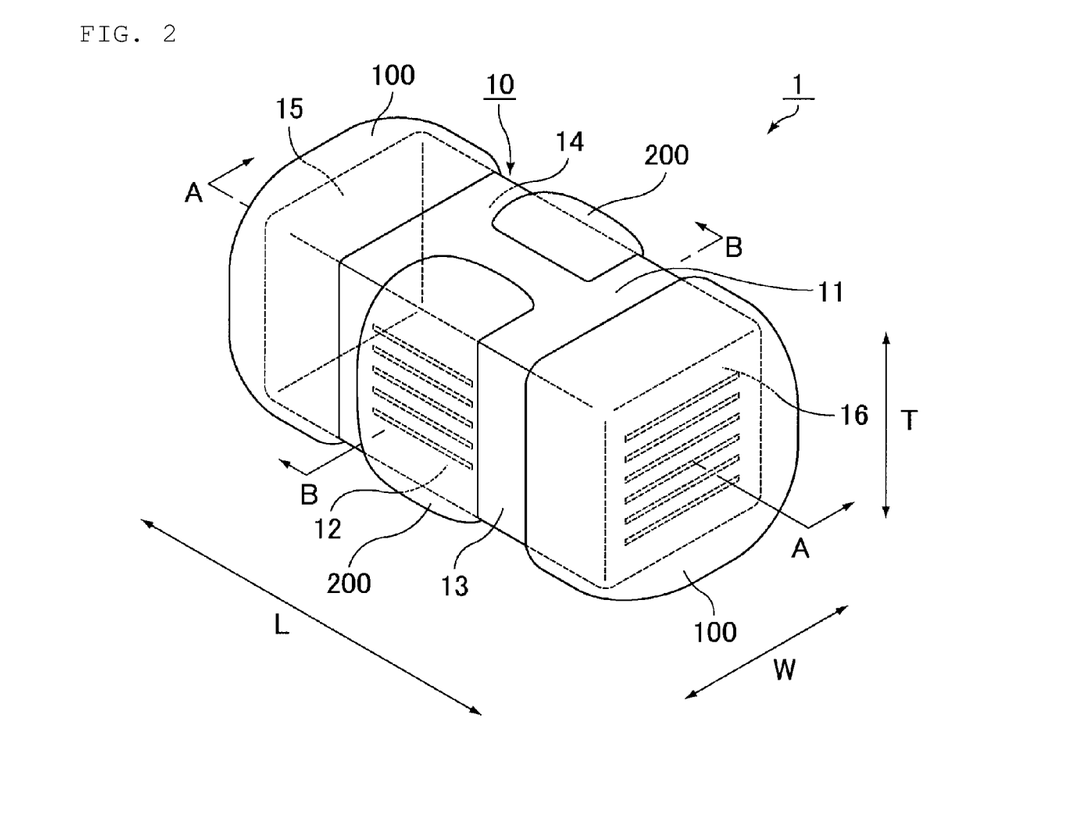
FIG. 2 is a perspective view schematically showing an example of the multilayer ceramic capacitor according to a preferred embodiment of the present invention.

In the multilayer ceramic capacitor and the laminated body according to a preferred embodiment of the present invention, the length direction, the width direction, and the lamination direction are regarded as the directions defined respectively by the double-headed arrows L, W, and T in the laminated body 10 shown in FIG. 1 and the multilayer ceramic capacitor 1 shown in FIG. 2. In this regard, the length direction, the width direction, and the lamination direction are orthogonal or substantially orthogonal to each other. The lamination direction refers to a direction in which a plurality of ceramic layers 20 and a plurality of internal electrode layers 30 defining the laminated body 10 are stacked. In the case of the laminated body 10 shown in FIG. 1 and the multilayer ceramic capacitor 1 shown in FIG. 2, the dimension in the length direction is longer than the dimension in the width direction. However, in multilayer ceramic capacitors and the laminated bodies according to preferred embodiments of the present invention, the magnitude relationship between the dimension in the length direction and the dimension in the width direction is not particularly limited, and the dimension in the length direction may be larger or smaller than the dimension in the width direction.

The laminated body 10 has a substantially cuboid shape with six surfaces, and includes a plurality of ceramic layers 20 and a plurality of internal electrode layers 30 that are laminated. The laminated body 10 includes a first principal surface 11 and a second principal surface 12 opposed in the lamination direction T indicated by a double-headed arrow T in FIG. 1; a first side surface 13 and a second side surface 14 orthogonal or substantially orthogonal to the lamination direction T, opposed in the width direction W indicated by a double-headed arrow W; and a first end surface 15 and a second end surface 16 orthogonal or substantially orthogonal to the lamination direction T and the width direction W, opposed to the length direction L indicated by a double-headed arrow L.

In this specification, a cross section of the laminated body 10 orthogonal or substantially orthogonal to the first end surface 15 and the second end surface 16 and parallel or substantially parallel to the lamination direction of the laminated body 10 is referred to as an LT cross section. In addition, a cross section of the laminated body 10 orthogonal or substantially orthogonal to the first side surface 13 and the second side surface 14 and parallel or substantially parallel to the lamination direction of the laminated body 10 is referred to as a WT cross section.

In addition, a cross section of the laminated body 10 orthogonal or substantially orthogonal to the first side surface 13, the second side surface 14, the first end surface 15, and the second end surface 16 and orthogonal or substantially orthogonal to the lamination direction of the laminated body 10 is referred to as an LW cross section.

The ceramic layers 20 include outer layer portions 21 and an inner layer portion 22. The outer layer portions 21 refer to ceramic layers located closer to both principal surfaces of the laminated body 10 and located between the principal surfaces and the internal electrode layers closest to the principal surfaces.

The region sandwiched between both outer portions 21 is the inner layer portion 22.

In the case of the multilayer ceramic capacitor 1 shown in FIG. 2, the end surfaces (the first end surface 15 and the second end surface 16) of the laminated body 10 shown in FIG. 1 are covered with external electrodes 100 with resistance (hereinafter also referred to simply as an external electrode with resistance), and the side surfaces (the first side surface 13 and the second side surface 14) of the laminated body 10 are partially covered with low-resistance external electrodes 200 (hereinafter, referred to simply as a low-resistance external electrode).

In the case of the multilayer ceramic capacitor according to a preferred embodiment of the present invention, at least one of the external electrodes covering exposed regions is only required to define and function as an external electrode with resistance, and the other external electrodes may define and function as an external electrode with resistance, or a low-resistance external electrode.

Subsequently, the ceramic layers and the internal electrode layers defining the multilayer ceramic capacitor according to a preferred embodiment of the present invention will be described with reference to FIGS. 3A and 3B.

Figure 3A:
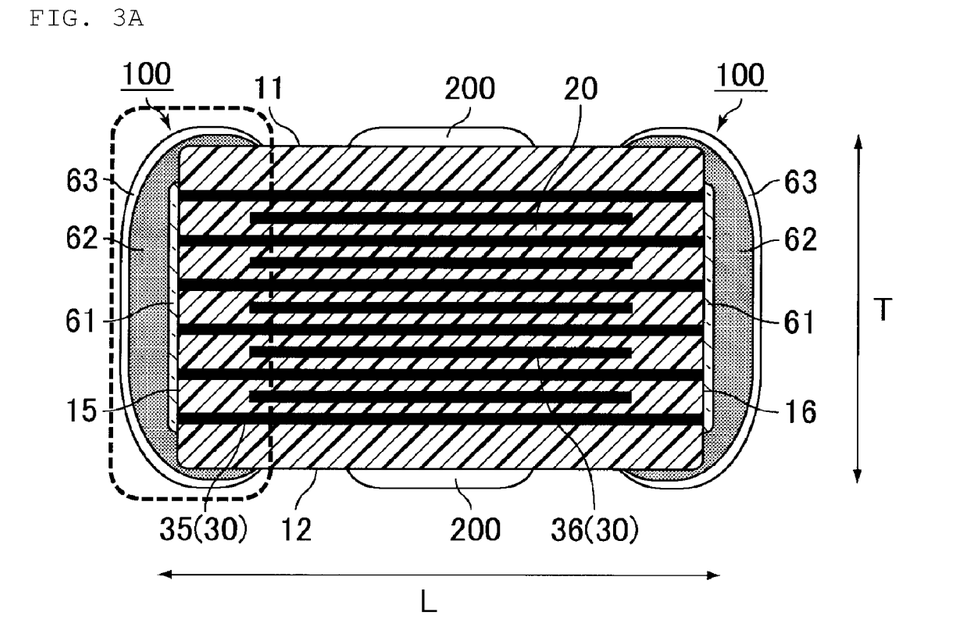

FIG. 3A is a cross-sectional view schematically showing an example of an LT cross section of the multilayer ceramic capacitor shown in FIG. 2. FIG. 3A is also a cross-sectional view taken along the line A-A in FIG. 2.

Figure 3B:
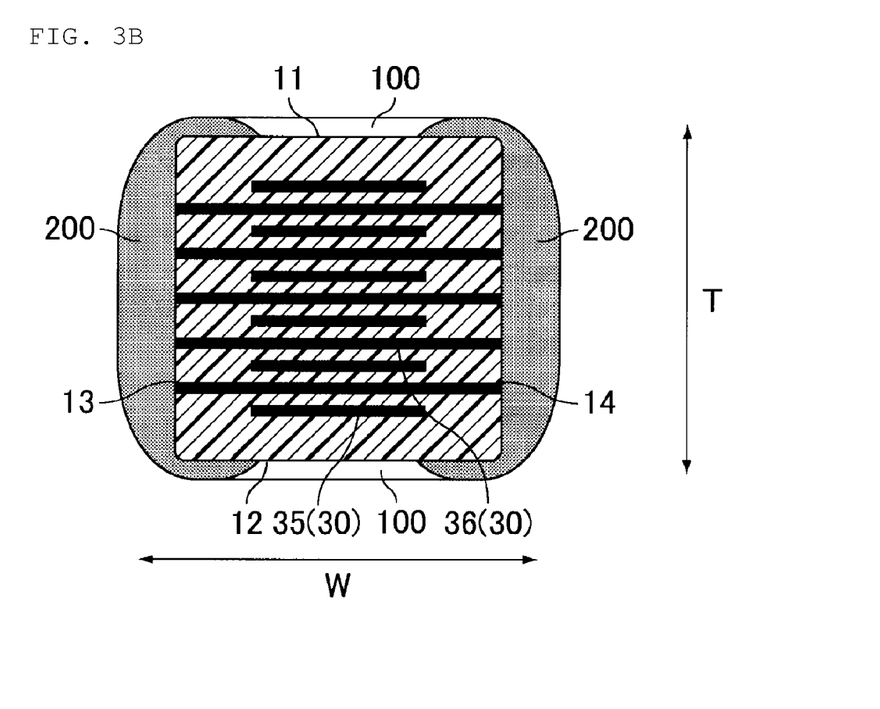
FIG. 3B is a cross-sectional view schematically showing an example of a WT cross section of the multilayer ceramic capacitor shown in FIG. 2.

FIG. 3B is a cross-sectional view schematically showing an example of a WT cross section of the multilayer ceramic capacitor shown in FIG. 2. FIG. 3B is also a cross-sectional view taken along the line B-B in FIG. 2.

As shown in FIGS. 3A and 3B, the plurality of internal electrode layers 30 include a first internal electrode layer 35 and a second internal electrode layer 36 that are laminated. The first internal electrode layer 35 is exposed at the first end surface 15 and the second end surface 16, and the second internal electrode layer 36 is exposed at the first side surface 13 and the second side surface 14. Electrostatic capacitance is generated at an opposed electrode portion at which the first internal electrode layer 35 and the second internal electrode layer 36 are opposed to each other with the ceramic layer 20 interposed therebetween.

The exposed region at which the first internal electrode layer 35 is exposed is covered with the external electrode 100 with resistance.

The external electrode 100 with resistance includes a thin film electrode layer 61 that is in direct contact with the internal electrode layer 30 (first internal electrode layer 35), a resistive electrode layer 62 provided on the thin film electrode layer 61, and an upper electrode layer 63 provided on the resistive electrode layer 62, which has a lower electrical resistivity than the resistive electrode layer 62.

The first internal electrode layer 35 includes an opposed electrode portion opposed to the second internal electrode layer 36 with the ceramic layer 20 interposed therebetween, and an extended electrode portion extended from the opposed electrode portion to the first end surface 15 or the second end surface 16, and regions at which the first internal electrode layer 35 is exposed are provided on the first end surface 15 and the second end surface 16.

The region at which the first internal electrode layer 35 (extended electrode portion) is exposed at the first end surface 15 is referred to as a first exposed region, and the region at which the first internal electrode layer 35 (extended electrode portion) is exposed at the second end surface 16 is referred to as a second exposure region.

The second internal electrode layer 36 includes an opposed electrode portion opposed to the opposed electrode portion of the first internal electrode layer 35 with the ceramic layer 20 interposed therebetween, and an extended electrode portion extended from the opposed electrode portion to the first side surface 13 or the second side surface 14 and exposed, and a third exposed region at which the second internal electrode layer 36 is exposed is provided on the first side surface 13, and a fourth exposed region at which the second internal electrode layer 36 is exposed is provided on the second side surface 14. The third exposed region and the fourth exposed region are each covered with a low-resistance external electrode 200 without any resistive electrode layer.

Figure 4:
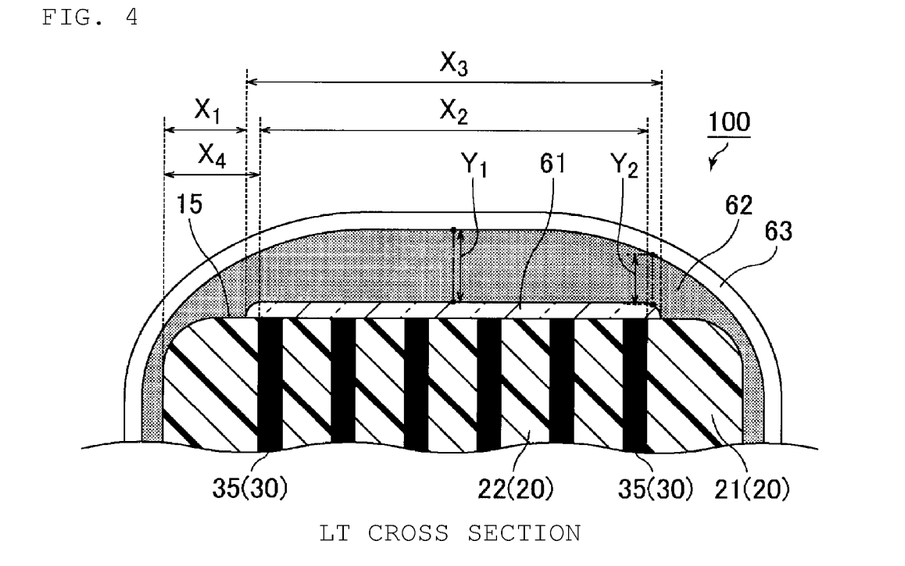
FIG. 4 is an enlarged sectional view of a region in the vicinity of an external electrode with resistance, which is surrounded by a dashed line in FIG. 3A.

FIG. 4 is an enlarged sectional view of a region in the vicinity of the external electrode with resistance, surrounded by a dashed line in FIG. 3A.

As shown in FIG. 4, in the exposed region where the first internal electrode layer 35 is exposed, the first internal electrode layer 35 makes direct contact with the thin film electrode layer 61. The first exposed region at which the first internal electrode layer 35 is exposed at the first end surface 15 refers to a region including the two first inner electrode layers 35 disposed outermost (the region indicated by a double-headed arrow $X_2$ in FIG. 4). In contrast, the region at which the thin film electrode layer 61 is provided (the region indicated by a double-headed arrow $X_3$ in FIG. 4) preferably completely covers the first exposed region.

In addition, the distance from a ridge of the laminated body to the thin-film electrode layer 61 is provided with a predetermined length (the length indicated by a double-headed arrow $X_1$ in FIG. 4), and the distance from the ridge of the laminated body to the first exposed region is provided with a predetermined length (the length indicated by double-headed arrow $X_4$ in FIG. 4).

Subsequently, the exposed region at which the internal electrode layer is exposed at the end surface of the laminated body, and the thin film electrode layer provided on the exposed region will be described with reference to FIG. 5.

Figure 5:
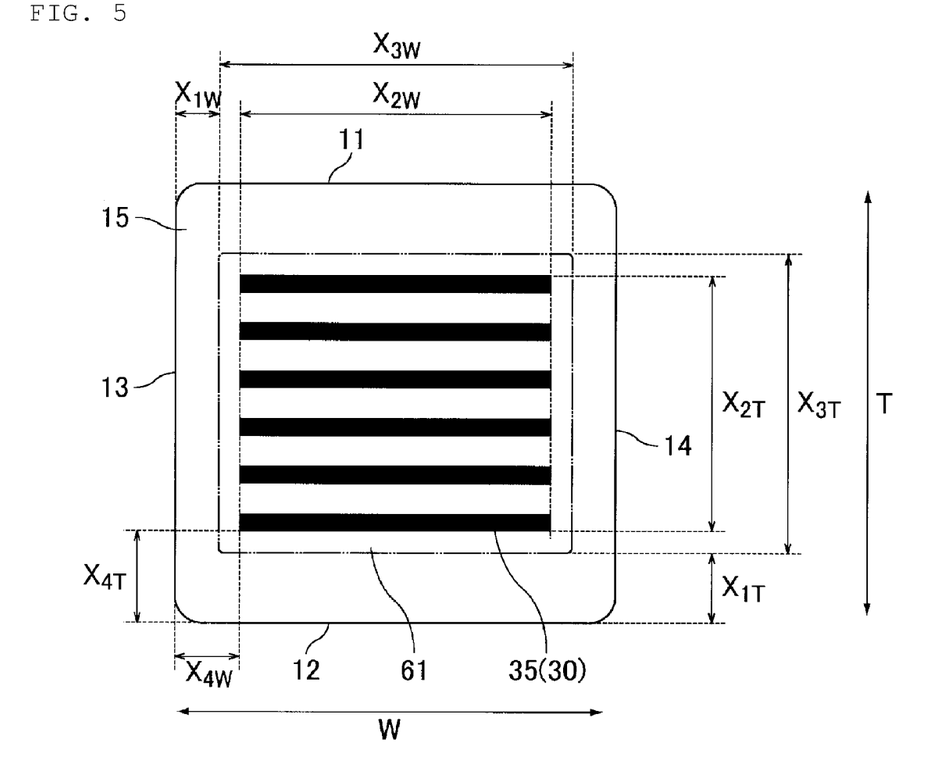
FIG. 5 is an explanatory diagram schematically illustrating an internal electrode layer, a thin film electrode layer, and a laminated body at the first end surface shown in FIGS. 3A and 3B.

FIG. 5 is an explanatory view schematically illustrating the internal electrode layer 30, the thin film electrode layer 61, and the laminated body at the first end surface shown in FIGS. 3A and 3B. In FIG. 5, the region at which the thin film electrode layer is provided is indicated by a two-dot chain line.

As shown in FIG. 5, the region at which the first internal electrode layer 35 is exposed refers to a substantially rectangular region indicated by a double-headed arrow $X_{2W}$ extending in the width direction (W direction) and a double-headed arrow $X_{2T}$ extending in the lamination direction (T direction). This region is the first exposed region.

The thin film electrode layer 61 is provided so as to cover the first exposed region (the region covered by the thin film electrode layer 61 is indicated by a two-dot chain line in FIG. 5). The region at which the thin film electrode layer 61 is provided refers to a substantially rectangular region indicated by a double-headed arrow $X_{3W}$ extending in the width direction (W direction) and a double-headed arrow $X_{3T}$ extending in the lamination direction (T direction), which completely covers the first exposed region.

When the thin film electrode layer 61 completely covers the first exposed region, the contact resistance between the first internal electrode layer 35 and the thin film electrode layer 61 is reduced.

The length from the second principal surface 12 to the first internal electrode layer 35 is denoted by $X_{4T}$. The length indicated by the double-headed arrow $X_{4T}$ is also referred to as a T gap. On the other hand, the length from the first side surface 13 to the first internal electrode layer 35 is indicated by a double-headed arrow $X_{4W}$. The length indicated by double-headed arrow $X_{4W}$ is also referred to as a W gap.

The distance from the second principal surface 12 to the thin film electrode layer 61 is indicated by a double-headed arrow $X_{1T}$. When the length denoted by $X_{1T}$ is smaller than the length indicated by $X_{4T}$, the thin film electrode layer 61 is able to cover all of the first exposed region in the T direction, which is preferable. Furthermore, for example, the length denoted by $X_{1T}$ is preferably about ⅓ or more of the length denoted by $X_{4T}$ (that is, the distance from the second principal surface 12 to the thin film electrode layer 61 is preferably about ⅓ or more of the T gap), more preferably about ½ or more thereof, and further preferably about 9/10 or more thereof. The same applies to the distance from the first principal surface 11 to the thin film electrode layer 61.

The distance from the first side surface 13 to the thin film electrode layer 61 is indicated by a double-headed arrow $X_{1W}$. When the length denoted by $X_{1W}$ is smaller than the length indicated by $X_{4W}$, the thin film electrode layer 61 is able to cover all of the first exposed region in the W direction, which is preferable. Furthermore, for example, the length denoted by $X_{1W}$ is preferably about ⅓ or more of the length denoted by $X_{4W}$ (that is, the distance from the first side surface 13 to the thin film electrode layer 61 is about ⅓ or more of the W gap), more preferably about ½ or more thereof, and further preferably about 9/10 or more thereof. The same applies to the distance from the second side surface 14 to the thin film electrode layer 61.

When the distance from the side surface or the principal surface of the laminated body to the thin film electrode layer is, for example, about 9/10 or more of the W gap or the T gap, respectively, the thin film electrode layer 61 will be provided in a region away from the vicinity of the ridge of the laminated body (hereinafter also referred to as an edge portion), and the thickness of the resistive electrode layer provided on the thin-film electrode layer is thus, less likely to be affected by variation at the edge portion.

Figure 6:
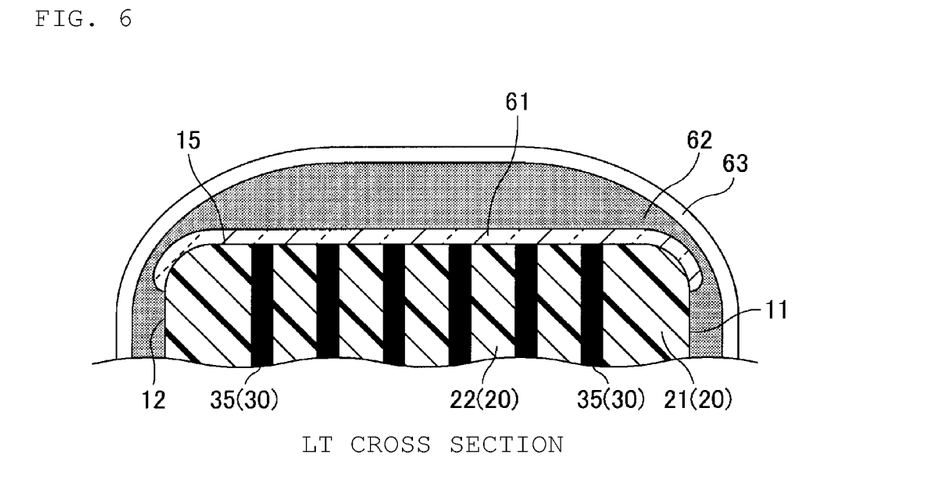
FIG. 6 is an LT cross-sectional view schematically showing another example of a multilayer ceramic capacitor according to a preferred embodiment of the present invention.

However, as shown in FIG. 6, in a multilayer ceramic capacitor according to a preferred embodiment of the present invention, the thin film electrode layer 61 may completely cover the first end surface 15, or the thin film electrode layer 61 may partially wrap around the other surfaces.

FIG. 6 is an LT cross-sectional view schematically showing another example of a multilayer ceramic capacitor according to a preferred embodiment of the present invention. In the multilayer ceramic capacitor shown in FIG. 6, the thin film electrode layer 61 provided on the first end surface 15 wraps around the first principal surface 11 and the second principal surface 12, so as to partially protrude from the first end surface 15.

It is to be noted that in this specification, the multilayer ceramic capacitor is described as preferably including the laminated body in which the first internal electrode layer is exposed at the first end surface 15 and the second end surface 16, and the second internal electrode layer is exposed at the first side surface 13 and the second side surface 14, but the laminated bodies defining multilayer ceramic capacitors according to preferred embodiments of the present invention is not limited to the laminated body configured as mentioned above. For example, even when a laminated body is provided in which the first internal electrode layer 35 is exposed at the first end surface 15, the second internal electrode layer 36 is exposed at the second end surface, and no internal electrode layer is exposed at the first side surface 13 or the second side surface 14, the laminated body in which exposed regions exposed at the first end surface 15 and/or the second end surface 16 are covered with external electrodes, and at least one of the external electrodes is provided as the external electrode 100 with resistance is regarded as a multilayer ceramic capacitor according to preferred embodiments of the present invention.

The laminated body 10 preferably includes corners and ridges that are rounded. The corners refer to the intersection of three surfaces of the laminated body, and the ridges refer to the intersection of two surfaces of the laminated body.

It is to be noted that the distance from the ridge to the thin film electrode layer is regarded as a distance from the ridge in the case of assuming that the ridge is not rounded, even when the ridge is rounded.

The length of the laminated body 10 in the L direction thereof is preferably about 0.4 mm or more and about 5.7 mm or less, more preferably about 0.46 mm or more and about 4.6 mm or less, and further preferably about 0.46 mm or more and about 3.2 mm or less, for example. The length of the laminated body 10 in the W direction thereof is preferably about 0.2 mm or more and about 5.0 mm or less, more preferably about 0.28 mm or more and about 2.75 mm or less, and further preferably about 0.28 mm or more and about 2.5 mm or less, for example. The length of the laminated body 10 in the T direction thereof is preferably about 0.19 mm or more and about 2.7 mm or less, more preferably about 0.2 mm or more and about 2.5 mm or less, and further preferably about 0.2 mm or more and about 1.95 mm or less, for example.

The number of the ceramic layers is preferably 50 or more and 600 or less, more preferably 100 or more and 600 or less, for example. It is to be noted that the number of ceramic layers defining the outer layer portion is not included in the number of the ceramic layers.

The thickness of each ceramic layer defining the inner layer portion, among the ceramic layers, is preferably about 0.4 μm or more and about 3.0 μm or less, for example. In addition, the thickness of the outer layer portion is preferably about 20 μm or more and about 80 μm or less on one side, more preferably about 30 μm or more and about 80 μm or less, for example.

The respective dimensions of the laminated body as mentioned above can be measured with a micrometer, and the number of ceramic layers can be counted with the use of an optical microscope.

As each of the ceramic layers, for example, a perovskite-type compound may preferably be used which is expressed by the general formula $AmBO_3$ (the A site represents Ba, and may include, besides Ba, at least one selected from the group consisting of Sr and Ca; the B site represents Ti, and may include, besides Ti, at least one selected from the group consisting of Zr and Hf; O represents oxygen; and m represents a molar ratio between the A site and the B site) as represented by a barium titanate ($BaTiO_3$).

Alternatively, a ceramic material may be used including, as its main constituent, calcium titanate ($CaTiO_3$), strontium titanate ($SrTiO_3$), calcium zirconate ($CaZrO_3$), or the like. In addition, each of the ceramic layers may include Mn, Mg, Si, Co, Ni, V, Al, a rare earth element or the like as an accessory constituent that is lower in content than the main constituent.

The internal electrode layers preferably include a metal material such as Ni, Cu, Ag, Pd, Ag—Pd alloy or Au, for example. In addition, it is also preferable to include a dielectric material that has the same or substantially the same composition as the ceramic material included in the ceramic layers.

The number of internal electrode layers is preferably 50 or more and 600 or less, more preferably 100 or more and 600 or less, for example. In addition, the internal electrode layers are preferably about 0.3 μm or more and about 1.0 μm or less, for example, in average thickness.

In the multilayer ceramic capacitor according to a preferred embodiment of the present invention, all of the external electrodes that cover the exposed region at which the first internal electrode layer is exposed, or all the external electrodes that cover the exposed region at which the second internal electrode layer is exposed preferably define external electrodes with resistance.

When there are two or more exposed regions at which the first internal electrode layer is exposed, and when at least one of the exposed regions is covered with an external electrode that is not an external electrode with resistance, current preferentially flows through the exposed region covered with the external electrode that is not an external electrode with resistance among the exposed regions where the first internal electrode layer is exposed, thus making it difficult to design the resistance value of the whole multilayer ceramic capacitor. The same applies to the exposed region at which the second internal electrode layer is exposed.

In a multilayer ceramic capacitor according to a preferred embodiment of the present invention, the exposed regions are covered with external electrodes.

The external electrodes include an external electrode with resistance and a low-resistance external electrode.

The external electrode with resistance includes a thin film electrode layer, a resistive electrode layer, and an upper electrode layer that has a lower electrical resistivity than the resistive electrode layer. The external electrode with resistance covers at least one of the exposed regions provided at the laminated body. The thin film electrode layer is in direct contact with the first internal electrode layer or the second internal electrode layer, the resistive electrode layer is provided on the thin film electrode layer, and the upper electrode layer is provided on the resistive electrode layer.

At least one of the external electrodes that cover the exposed regions at which the internal electrode layer is exposed defines an external electrode with resistance, composed of a thin film electrode layer, a resistive electrode layer, and an upper electrode layer. The internal electrode layer is exposed in the exposed region, and the thin film electrode layer is in direct contact with the internal electrode layer.

Considering the equivalent circuit of the multilayer ceramic capacitor according to the present preferred embodiment of the present invention, the wirings collected from multiple capacitor element portions at one location by the thin film electrode layer may be regarded as being connected to the resistive electrode layer. On the other hand, when the internal electrode layer makes direct contact with the resistive electrode layer, a plurality of circuits each including a capacitor element and a resistance element connected in series may be regarded as being connected in parallel. Therefore, in the multilayer ceramic capacitor according to the present preferred embodiment, the connectivity is more stable as compared with the case in which the internal electrode layer makes direct contact with the resistive electrode layer.

The thin film electrode layer preferably has an electrical resistivity of about $1.65 \times 10^{-6}$ Ω·cm or more and about $1.65 \times 10^{-4}$ Ω·cm or less, for example. In addition, the thin film electrode layer preferably has a lower electrical resistivity than the resistive electrode layer.

The thin film electrode layer is an atomic layer of deposited atoms unlike a layer of a conductive paste baked, and may be formed by a thin film forming method such as plating, sputtering, and vapor deposition, for example. These methods can form a thin film electrode layer with a desired thickness while reducing or preventing variations in the thickness of the thin film electrode layer.

From the viewpoints of electrical resistivity, adhesiveness of the thin film electrode layer, ease of manufacturing the thin film electrode, and other relevant factors, a plating electrode that is formed by plating is preferred.

It is to be noted that the thin-film electrode layer formed by plating is referred to as a plating electrode, the thin-film electrode layer formed by sputtering is referred to as a sputtering electrode, and the thin-film electrode layer formed by vapor deposition is referred to as a vapor-deposited electrode.

It is to be noted that the thin film electrode layer may include multiple layers that are laminated and including at least one electrode among the plating electrode, the sputtering electrode, and the vapor-deposited electrode.

In the case of attempting to achieve a preferable thickness (described later) for the thin film electrode layer, the thin film forming methods mentioned above are appropriate. The electrode layer formed by a method other than the thin film forming method mentioned above, for example, paste dipping has insufficient flatness in terms of thickness, and has difficulty achieving a preferable thickness (described later) in relation to the paste viscosity.

The metal used for the thin film electrode layer preferably includes at least one metal selected from the group consisting of Cu, Ni, Ag, Pd, an Ag—Pd alloy and Au, and more preferably contains Cu, for example. It is to be noted that the thin film electrode layer is preferably a layer containing no glass, where the content ratio of metal per unit volume is about 99 vol % or higher, for example.

The thickness of the thin film electrode layer is not particularly limited, but is preferably about 0.5 μm or more and about 9 μm or less, more preferably about 1 μm or more and about 5 μm or less, and further preferably about 2 μm or more and about 3 μm or less, for example.

The thickness of the thin film electrode layer can be measured by cutting the multilayer ceramic capacitor to expose an LT cross section and observing the cross section with a microscope. At five points obtained by equally dividing one thin film electrode layer on the exposed region at which the internal electrode layer is exposed, into four in the T direction (three points that are boundaries between the divided thin film electrode layers and two points as both ends in the T direction), the operation of calculating the thickness of the thin film electrode layer is performed for six samples, and the average value for the thirty points is regarded as the thickness of the thin film electrode layer.

The thin film electrode layer is preferably disposed in a plane in which the exposed region is provided at the laminated body when the laminated body is viewed from the L direction in plan view. The thickness of the resistive electrode layer is likely to become thin in the vicinity of the ridge (also referred to as an edge) of the laminated body, and likely to vary. If the thin film electrode layer extends outside the plane in which the exposed region is provided, the current flowing through the resistive electrode layer in the vicinity of the ridge will be increased, thus causing the resistance value of the multilayer ceramic capacitor to fluctuate, or making it difficult to design the resistance value.

In addition to the resistance component, if necessary, glass, a metal, and a metal oxide are added to the resistive electrode layer.

The resistance component refers to a component that has a relatively high electrical resistivity excluding metals and glasses included in common external electrodes, and specifically, a metal oxide excluding glass, carbon, or other suitable material.

For example, In—Sn composite oxides (ITO), La—Cu composite oxides, Sr—Fe composite oxides, Ca—Sr—Ru composite oxides, and other suitable materials, for example, may preferably be used as the metal oxide (hereinafter also referred to as a first metal oxide) defining the resistive component.

Amorphous carbon such as carbon black, graphite, and other suitable materials, for example, may preferably be used as the carbon.

B—Si based glass, B—Si—Zn based glass, B—Si—Zn—Ba based glass, B—Si—Zn—Ba—Ca—Al based glass, and other suitable materials may preferably be used as the glass.

The volume ratio between the first metal oxide and the glass in the resistive electrode layer is preferably about 30:70 to about 70:30, for example.

The metal is preferably composed of at least one metal selected from the group consisting of Ag, Ni, Cu, Au and Pd. It is more preferable to contain Ni among these metals. This is because the particle size of Ni is able to be made finer.

Examples of the metal oxide (hereinafter also referred to as a second metal oxide) other than the first metal oxide include $Al_2O_3$, $ZrO_2$, $TiO_2$, and ZnO.

The electrical resistivity of the resistive electrode layer and the denseness of the resistive electrode layer may be adjusted with the resistive component, the glass, the metal, and the second metal oxide.

For example, the addition of the metal decreases the electrical resistivity of the resistive electrode layer, whereas the addition of the second metal oxide increases the electrical resistivity of the resistive electrode layer.

In addition, the addition of the metal such as Ni and Cu, or $Al_2O_3$ or $TiO_2$, for example, promotes densification of the resistive electrode layer. On the other hand, the addition of the metal such as Mo, Cr, and Nb, or the second metal oxide such as $ZrO_2$ and ZnO, for example, reduces or prevents densification of the resistive electrode layer.

It is to be noted that reduction or prevention of densification has a meaning of preventing the generation of blisters due to the resistive electrode layer over-sintered.

The thickness of the resistive electrode layer is not particularly limited, but is preferably about 5 μm or more and about 25 μm or less, for example. It is to be noted that the thickness of the resistive electrode layer is, as in the case of the thickness of the thin film electrode layer, regarded as an average value for thirty points, by measuring, for six samples, the thickness of the resistive electrode layer at five points obtained by equally dividing the exposed region where the internal electrode layer is exposed into four in the T direction.

In addition, preferably, there is no variation in the thickness of the resistive electrode layer provided directly on the thin film electrode layer. Furthermore, with regard to the thickness of the resistive electrode layer provided directly on the thin film electrode layer, the thickness difference between the thickest portion (the portion indicated by a double-headed arrow $Y_1$ in FIG. 4) and the thinnest portion (the portion indicated by a double-headed arrow $Y_2$ in FIG. 4) is preferably about 15 μm or less, and more preferably about 5 μm or less, for example.

The electrical resistivity of the resistive electrode layer is preferably about 0.01 Ω·cm or more and about 100 Ω·cm or less, more preferably about 0.05 Ω·cm or more and about 10 Ω·cm or less, and further preferably about 0.05 Ω·cm or more and about 1 Ω·cm or less, for example.

The resistive electrode layer preferably covers the entire thin-film electrode layer disposed directly under the resistive electrode layer. When a portion of the thin film electrode layer is not covered with the resistive electrode layer, a current preferentially flows through the uncovered region, thus making it difficult to design the resistance value of the whole multilayer ceramic capacitor.

The resistive electrode layer is preferably disposed in a plane in which the exposed region is provided at the laminated body when the laminated body is viewed from the L direction in plan view. When the resistive electrode layer is disposed in the plane in which the exposed region is provided at the laminated body, the resistive electrode layer is not disposed on the other surfaces beyond the ridge of the laminated body. Therefore, the thickness of the resistive electrode layer is prevented from varying in the vicinity of the ridge (also referred to as an edge) of the laminated body.

The upper electrode layer only needs to have a lower electrical resistivity than the resistive electrode layer, and preferably includes at least one metal selected from the group consisting of, for example, Cu, Ni, Ag, Pd, an Ag—Pd alloy and Au, and further preferably contains Cu. It is to be noted that the thin film electrode layer is preferably a layer containing no glass, where the content ratio of metal per unit volume is about 99 vol % or higher, for example.

The thickness of the upper electrode layer is not particularly limited, but when the external electrode with resistance is provided on the end surface of the laminated body, the thickness of the upper electrode layer defining the external electrode with resistance is preferably about 5 µm or more and about 50 µm or less, for example. When the external electrode with resistance is provided on the side surface of the laminated body, the thickness of the upper electrode layer defining the external electrode with resistance is preferably about 5 µm or more and about 40 µm or less, for example.

The thickness of the upper electrode layer is, as in the case of the thickness of the thin film electrode layer, regarded as an average value for thirty points, by measuring, for six samples, the thickness of the upper electrode layer at five points obtained by equally dividing the exposed region where the first internal electrode layer is exposed into four in the T direction.

In the multilayer ceramic capacitor according to the present preferred embodiment, some of the external electrodes that cover the exposed regions provided at the laminated body may be low-resistance external electrodes.

The low-resistance external electrode is an external electrode without a resistive electrode layer, and is not particularly limited as long as the external electrode is made of a material has a low electrical resistivity, but examples of the external electrode include, for example, an electrode obtained by applying and firing a conductive paste.

The low-resistance external electrode preferably has a lower electrical resistivity than the resistive electrode layer.

A non-limiting example of a method for manufacturing the multilayer ceramic capacitor according to a preferred embodiment of the present invention will be described below.

A method for manufacturing a multilayer ceramic capacitor according to a preferred embodiment the present invention includes a laminated body forming step of forming a substantially cuboid laminated body including a plurality of ceramic layers and a plurality of internal electrode layers laminated, and including two or more exposed regions at which the plurality of internal electrode layers are exposed; and a covering step of covering the exposed regions with external electrodes, where the covering step includes a first coating step of covering at least one of the exposed regions with an external electrode with resistance including a thin film electrode layer, a resistive electrode layer provided on the thin film electrode layer, and an upper electrode layer provided on the resistive electrode layer, the upper electrode layer having a lower electrical resistivity than the resistive electrode layer, and in the first coating step, the thin film electrode layer is formed directly on the internal electrode layer exposed.

First, the laminated body forming step will be described.

In the laminated body forming step, a substantially cuboid laminated body is formed which includes a plurality of ceramic layers and a plurality of internal electrode layers laminated, and further includes two or more exposed regions from which a plurality of internal electrode layers is exposed.

The method for forming such a laminated body includes, for example, a method of stacking a predetermined number of ceramic green sheets to define ceramic layers with internal electrode patterns to define internal electrode layers formed thereon, compressing the sheets with the patterns into a green sheet laminated body, and firing the body.

The ceramic green sheets may be obtained, for example, through the application of, into the form of a sheet, ceramic slurry obtained by mixing a metal oxide, an organic substance, a solvent and other components as raw materials for the ceramic layers, onto a carrier film, such as a PET film by a method such as spray coating, die coating, or screen printing. The thickness of the ceramic green sheet is preferably about 0.4 µm or more and about 3.0 µm or less, for example.

The same material as the raw material defining the ceramic layers in the multilayer ceramic capacitor may be suitably used as the metal oxide as a raw material for the ceramic layers.

The conductive paste for the internal electrode layers is preferably composed of a metal material, such as a Ni powder, a solvent, a dispersant, and a binder, and may be applied by printing onto the ceramic green sheets by a method such as screen printing or gravure printing, for example, thus preparing internal electrode patterns.

The thickness of the internal electrode pattern applied by printing is preferably about 0.3 µm or more and about 1.0 µm or less, for example.

Methods for the compression include, for example, rigid body press or isostatic press.

Further, disposing a resin sheet with a certain thickness on the outermost layer at the time of pressing also applies a sufficient pressure to the portion without any internal electrode pattern formed, thus making it possible to improve the adhesion force between the ceramic green sheets.

Thereafter, the obtained green sheet laminated body is, if necessary, subjected to cutout so as to expose the internal electrode layers at two or more locations, and subjected to firing under predetermined conditions, thus providing a laminated body.

Further, it is preferable to perform barrel polishing by disposing the green sheet laminated body cut into a predetermined shape and an abrasive in a barrel, and imparting rotational motion to the barrel, thus providing rounded corners and ridges of the laminated body.

Subsequently, the coating step will be described.

The coating step includes a step of covering the exposed region with the external electrode, and a first coating step described later.

In the first coating step, at least one of the exposed regions is covered with an external electrode with resistance, which includes a thin film electrode layer, a resistive electrode layer provided on the thin film electrode layer, and an upper electrode layer provided on the resistive electrode layer. In this case, the thin film electrode layer is formed directly on the internal electrode layer.

Methods for forming the thin film electrode layer directly on the internal electrode layer include plating, vapor deposition, and sputtering, for example, but it is preferable to form the thin film electrode layer by plating method.

The material for the thin film electrode layer described for the multilayer ceramic capacitor may be suitably used as a material for the thin film electrode layer.

Further, in the formation of the thin film electrode layer directly on the internal electrode layer, a catalyst or the like may be attached to the surface of the internal electrode layer.

The attachment of a catalyst or the like to the surface of the internal electrode layer makes it easy to control the region in which the thin film electrode layer is formed.

The thin film electrode layer is preferably not formed on the surface other than the surface at which the internal electrode layer is exposed. In addition, it is preferable to form the thin film electrode layer such that the distance from the ridge of the laminated body to the thin film electrode layer in the W direction of the laminated body is about ⅓ or more of the W gap of the laminated body, more preferably about ½ or more, and further preferably about 9/10 or more, for example. Furthermore, it is preferable to form the thin film electrode layer such that the distance from the ridge of the laminated body to the thin film electrode layer in the T direction of the laminated body is about ⅓ or more of the T gap of the laminated body, more preferably about ½ or more, and further preferably about 9/10 or more, for example.

The thickness of the thin film electrode layer is not particularly limited, but is preferably less than a thickness of a resistive electrode layer formed in accordance with a subsequent step, and more preferably about 0.5 µm or more and about 9 µm or less, for example.

Subsequently, a resistive electrode layer is formed on the thin film electrode layer.

Methods for forming the resistive electrode layer on the thin film electrode layer include, for example, a method in which the end surface (or the side surface) of the laminated body with the thin film electrode layer formed thereon is impregnated with a resistive electrode paste to define a resistive electrode layer, and then subjected to firing, and a method in which a resistive electrode paste to define a resistive electrode layer processed into the form of a sheet is provided on the surface of the thin film electrode layer, and then subjected to firing.

The thickness of the resistive electrode paste formed on the thin film electrode layer is not particularly limited, but preferably a thickness such that the thickness of the fired resistive electrode layer is about 5 µm or more and about 25 µm or less, for example.

The resistive electrode paste preferably includes, for example, a metal oxide powder, glass, a dispersant, a solvent and the like, and has a certain viscosity.

Methods of processing the resistive electrode paste into the form of a sheet include, for example, a method of applying the resistive electrode paste onto a carrier film, drying the paste, and then peeling the carrier film off.

The same materials as the materials defining the resistive electrode layer described for the multilayer ceramic capacitor may be suitably used for the metal oxide and glass defining the resistive electrode paste.

The resistive electrode layer is formed on the thin film electrode layer by firing the resistive electrode paste or resistive electrode paste processed into the form of a sheet in accordance with a first firing step. The maximum temperature in the first firing step is not particularly limited, but preferably about 700° C. or higher and about 800° C. or lower, and furthermore, the maximum temperature in the first firing step is preferably higher than the maximum temperature in the second firing step described later.

Subsequently, an upper electrode layer is formed on the resistive electrode layer.

Methods for forming the upper electrode layer on the resistive electrode layer include, for example, a method in which an upper electrode paste with metal particles constituting the upper electrode layer dispersed in a solvent is applied onto the resistive electrode layer, and subjected to firing, and a method in which an upper electrode paste sheet obtained by forming an upper electrode paste into the form of a sheet is applied onto the resistive electrode layer, and subjected to firing.

Alternatively, a conductive resin paste including the metal particles defining the upper electrode layer and a thermosetting resin may be applied onto the resistive electrode layer, and subjected to a heat treatment to thermally cure the resin, thus forming the upper electrode layer.

The thickness of the upper layer electrode paste applied or provided onto the resistive electrode layer is not particularly limited, but the fired upper electrode layer is preferably about 5 µm or more and about 50 µm or less in the case of the end surface, and about 5 µm or more and about 40 µm or less in the case of the side surface, for example.

The upper electrode paste defining the upper electrode layer may have any composition as long as the electrical resistivity of the upper electrode layer is lower than that of the resistive electrode layer, and for example, preferably includes metal particles, glass, dispersant, a solvent, and other components, and has a certain degree of viscosity.

The average particle size of the metal particles defining the upper metal layer is preferably as small as possible, and more preferably the average particle size is about 0.1 µm or more and about 3 µm or less, for example.

As the average particle size of the metal particles is smaller, the area of contact with the resistive electrode layer is increased, and sintering is more likely to proceed even at low temperature.

The same materials as the materials defining the upper electrode layer described for the multilayer ceramic capacitor described above may be suitably used for the metal particles and glass defining the upper electrode paste.

The metal particles defining the upper electrode paste preferably include flattened metal particles. The inclusion of the flattened metal particles increases the thickness of the upper electrode layer covering the resistive electrode layer formed in the vicinity of the ridge of the laminated body, thus preventing the resistance value of the multilayer ceramic capacitor from varying from the design value.

The method for applying the upper electrode paste onto the resistive electrode layer is not particularly limited, but examples thereof include a method in which the end surface (or side surface) of the laminated body with the resistive electrode layer formed is impregnated with the upper electrode paste defining the upper electrode layer, and printing.

The upper electrode layer is formed on the resistive electrode layer by firing the upper electrode paste or upper electrode paste processed into the form of a sheet in accordance with a second firing step. The maximum temperature in the second firing step is not particularly limited, but preferably about 600° C. or higher and about 700° C. or lower, and the maximum temperature in the second firing step is preferably lower than the maximum temperature in the first firing step. If the maximum temperature in the second step is higher than the maximum temperature in the first firing step, there is a possibility that the once formed resistive electrode layer will be deteriorated by the second firing step.

With the foregoing steps, the external electrode with resistance covering the exposed region is formed.

It is to be noted that a plating layer may be further formed on the upper electrode layer which is the outermost layer of the external electrode with resistance. The formation of the plating layer improves solder wettability, and makes it easy to mount the multilayer ceramic capacitor. The composition of the plating layer is not particularly limited, but preferably includes nickel plating and tin plating, for example.

In addition, when the plating layer is formed on the upper electrode layer, a roughening treatment such as a blasting treatment or other suitable treatment, for example, may be applied to the surface of the upper electrode layer. By applying the surface roughening treatment, plating adhesiveness is improved.

In the method for manufacturing a multilayer ceramic capacitor according to a preferred embodiment of the present invention, the coating step may further include a second coating step.

The second coating step is a step of forming a low-resistance external electrode directly on the internal electrode layer with respect to the exposed region where the internal electrode layer is exposed.

For example, in the laminated body forming step, when a laminated body is formed which includes the first exposed region where the first internal electrode layer is exposed and the second exposed region opposed to the first exposed region, and the third exposed region where the second internal electrode layer is exposed and the fourth exposed region opposed to the third exposed region, the covering step may include the second coating step of forming low-resistance external electrodes directly on the second internal electrode layer exposed in the third exposed region and the fourth exposed region, in addition to the first coating step of forming external electrodes with resistance so as to cover the first exposed region and second exposed region of the laminated body.

Examples of the second covering step include, for example, a method in which a conductive paste is applied to the exposed region where the internal electrode layer is exposed, and subjected to firing.

As a conductive paste that may be used in the second coating step, the upper electrode paste used in the first coating step may be suitably used.

The low-resistance external electrode may be formed directly on the surface of the exposed region at which the internal electrode layer is exposed, by applying the upper electrode paste to the surface of the exposed region where the internal electrode layer is exposed, and then performing a third firing step.

The maximum temperature of the third firing step is not particularly limited, but preferably higher than the maximum temperature of the second firing step.

On the surface of the low-resistance external electrode, a plating layer may be formed, if necessary. The formation of the plating layer improves solder wettability, and makes it easy to mount the multilayer ceramic capacitor. The composition of the plating layer is not particularly limited, but preferably includes nickel plating and tin plating, for example.

The order of the first coating step and the second coating step is not particularly limited, and the first coating step may be performed first, the second coating step may be performed first, the second coating step may be partially performed during the first coating step, or the first coating step may be partially performed during the second coating step.

However, considering the compactness of the electrode to be formed and the firing temperature, the second coating step is preferably performed first.

Examples that more specifically disclose the multilayer ceramic capacitors according to preferred embodiments of the present invention will be described below. It is to be noted that the present invention is not to be considered limited to only these examples.

EXAMPLE 1

$BaTiO_3$ as a ceramic raw material was, with the addition of a polyvinyl butyral-based binder, a plasticizer, and ethanol as an organic solvent thereto, subjected to wet mixing with a ball mill, thus providing ceramic slurry. Then, this ceramic slurry was formed into sheets by a lip method, thus providing rectangular or substantially rectangular ceramic green sheets. Next, a conductive paste including Ni was applied by screen printing onto the ceramic green sheets, thus forming internal electrode patterns containing Ni as their main constituent. Next, the multiple ceramic green sheets with the internal electrode patterns formed thereon were stacked so as to alternate the sides to which the internal electrode layers were extended, thus providing a raw stacked sheet to define a capacitor main body. Next, this raw stacked sheet was subjected to pressure molding, and cut with a dicing machine, thus providing chips. The obtained chips were heated at about 1200° C. in an $N_2$ atmosphere to burn the binder, and then subjected to firing in a reducing atmosphere containing $H_2$, $N_2$ and $H_2O$ gases, thus providing a sintered laminated body. The structure of the laminated body includes a plurality of ceramic layers and a plurality of internal electrode layers. The dimensions of the laminated body were about 0.92 mm in the L direction×about 0.55 mm in the W direction×about 0.39 mm in the T direction. The first end surface and the second end surface as end surfaces in the L direction were each provided with an exposed region thereon, where the first internal electrode layer is exposed, and the first side surface and the second side surface as end surfaces in the W direction were each provided with an exposed region thereon, where the second internal electrode layer is exposed.

The average thickness of the internal electrode layers was about 0.55 μm, the average thickness of the ceramic layers sandwiched by the internal electrode layers was about 0.75 μm, and the number of internal electrodes was 266.

A conductive paste including a copper powder was applied to the surfaces of the second internal electrode layer exposed at the first side surface and the second side surface, and subjected to firing at about 850° C. to form low-resistance external electrodes respectively on the first side surface and the second side surface.

(1) Fabrication of Thin Film Electrode Layer

The first end surface and the second end surface were subjected to sandblasting, thus improving the degree of exposure of the internal electrode layers at the first end surface and the second end surface, and thus improving plating adhesiveness.

Thereafter, the entire laminated body was subjected to wet copper plating to form, on the first end surface and the second end surface, thin film electrode layers of about 2 μm in thickness directly connected to the first internal electrode layer, and forming plating layers on the low-resistance external electrodes on the first side surface and the second side surface. In this regard, the distances from the ridges of the thin film electrode layers formed on the first end surface and the second end surface were about 0.95 times as large as the W gap in the W direction, and about 0.95 times as large as the T gap in the T direction.

(2) Fabrication of Resistive Electrode Layer

A mixed powder obtained by mixing an In—Sn composite oxide, glass, and an Ni powder in proportions of about 40 wt %:about 50 wt %:about 10 wt % was dispersed in a solvent to prepare a resistive electrode paste. B—Si—Zn—Ba—Ca—Al-based glass was used as the glass. The obtained resistive electrode paste was applied with a dispenser so as to completely cover the thin film electrode layers formed on the first end surface and the second end surface, and not to protrude from each of the first end surface and the second end surface, and subjected to firing at about 770° C.

(3) Fabrication of Upper Electrode Layer

A mixture of copper particles (mixed spherical particles and flattened particles) of about 1 μm in average particle size with glass was dispersed in a solvent to prepare an upper electrode paste. In this regard, the composition of the upper electrode paste was adjusted so that the electrical resistivity of the upper electrode layer obtained by firing the upper electrode paste was lower than the electrical resistivity of the resistive electrode layer obtained by firing the resistive electrode paste.

As the glass, the same B—Si—Zn—Ba—Ca—Al-based glass as in the resistive electrode paste was used.

The first end surface and the second end surface were immersed in the obtained upper electrode paste to apply the upper electrode paste onto the resistive electrode layer, and then subjected to firing at about 650° C. The thickness of the formed upper electrode layer was about 20 μm at the thickest site.

In accordance with the procedure described above, the first end surface and the second end surface were each covered with an external electrode with resistance, including the thin film electrode layer, the resistive electrode layer, and the upper electrode layer.

After housing the laminated body in a finer-mesh net cage than the laminated body, polishing was performed by causing a zirconia powder to collide against the laminated body at a pressure of about 0.05 MPa for about 20 minutes while rotating the net cage, thus removing the glass at the surfaces of the upper electrode layers formed on the first end surface and the second end surface, and thus improving plating adhesiveness.

The polished laminated body was first subjected to Ni plating, and subsequently to Sn plating, thus forming nickel plating and tin plating layers respectively on the upper electrode layers formed on the first end surface and the second end surface, and on the low-resistance external electrodes formed on the first side surface and the second de surface.

In accordance with the procedure described above, a multilayer ceramic capacitor according to Example 1 was obtained.

It is to be noted that the composition and thickness of the resistive electrode layer were adjusted to adjust the ESR of the multilayer ceramic capacitor according to Example 1 to about 50 mΩ.

EXAMPLE 2

In (2) Fabrication of Resistive Electrode Layer in the first covering step, through the immersion of the first end surface and the second end surface in the resistive conductive paste, the resistive electrode paste was applied so as to protrude from the first end surface and the second end surface. A multilayer ceramic capacitor according to Example 2 was manufactured in accordance with the same or substantially the same procedure as in Example 1 except for this step.

EXAMPLE 3

Before the (1) Fabrication of Thin Film Electrode Layer in the first covering step, palladium particles as a catalyst were applied to the entire surfaces of the first end surface and the second end surface, and thereafter, thin film electrode layers were formed, thereby forming the thin film electrode layers partially on the first side surface, the second side surface, the first principal surface, and the second principal surface so as to protrude from the first end surface and the second end surface. A multilayer ceramic capacitor according to Example 3 was manufactured in accordance with the same or substantially the same procedure as in Example 2 except for this step.

COMPARATIVE EXAMPLE 1

In the first coating step, the composition of the resistive electrode paste used in the (2) Fabrication of Resistive Electrode Layer was changed without the (1) Fabrication of Thin Film Electrode Layer. A multilayer ceramic capacitor according to Comparative Example 1 was manufactured in accordance with the same or substantially the same procedure as in Example 1 except for the foregoing. In addition, the ESR of the multilayer ceramic capacitor according to Comparative Example 1 was adjusted to about 50 mΩ by changing the composition of the resistive electrode paste in the (2) Fabrication of Resistive Electrode Layer.

COMPARATIVE EXAMPLE 2

In the first coating step, the composition of the resistive electrode paste used in the (2) Fabrication of Resistive Electrode Layer was changed without the (1) Fabrication of Thin Film Electrode Layer. A multilayer ceramic capacitor according to Comparative Example 2 was manufactured in accordance with the same or substantially the same procedure as in Example 2 except for the foregoing. In addition, the ESR of the multilayer ceramic capacitor according to Comparative Example 2 was adjusted to about 50 mΩ by changing the composition of the resistive electrode paste in the (2) Fabrication of Resistive Electrode Layer.

The multilayer ceramic capacitors according to Examples 1 to 3 and Comparative Examples 1 and 2 were surrounded with a resin, and the LT side surfaces thereof were subjected to polishing, and polished to about ½ depths in the W direction, thus exposing LT cross sections. The polished surfaces were subjected to ion milling, thus removing sag due to the polishing, and providing cross sections for observation. The cross sections for observation were observed with a microscope to observe the regions at which the respective electrode layers (thin film electrode layer, resistive electrode layer and upper electrode layer) were formed. The results are shown in Table 1.

Twenty capacitors were prepared for each of the multilayer ceramic capacitors according to Examples 1 to 3 and Comparative Examples 1 and 2, mounted on a mounting substrate, and subjected to ESL measurement with the use of a network analyzer (E5071B from Agilent Technologies) in order to determine the average values for the twenty capacitors. The measurement frequency band was 100 MHz. The results are shown in Table 1.

Twenty capacitors were prepared for each of the multilayer ceramic capacitors according to Examples 1 to 3 and Comparative Examples 1 and 2, and subjected to ESR measurement with the use of an LCR meter (E4980A from Agilent Technologies) in order to determine the average values for the twenty capacitors and the fluctuations in ESR (ESR_CV). The measurement conditions were adapted to have 1 MHz and 0.01 Vrms. The results are shown in Table 1.

TABLE 1

| | | Example 1 | Example 2 | Example 3 | Comparative Example 1 | Comparative Example 2 |
|---|---|---|---|---|---|---|
| Regions of Respective Electrode Layers Formed | Thin Film Electrode Layer | Only on end surface | Only on end surface | To side surface | No | No |
| | Resistive Electrode Layer | Only on end surface | To side surface | To side surface | Only on end surface | To side surface |
| | Upper Electrode Layer | To side surface | To side surface | To side surface | To side surface | To side surface |
| | ESR | 50.3 | 48.5 | 51.2 | 52.0 | 51.0 |
| | ESR_CV | 6.0% | 6.1% | 20.5% | 10.2% | 11.5% |
| | ESL | 119.5 pH | 120.4 pH | 120.2 pH | 135.3 pH | 135.6 pH |

From the results in Table 1, it has been successfully confirmed that the non-limiting examples of multilayer ceramic capacitors according to preferred embodiments of the present invention has low ESL, and stable in connectivity between the internal electrode layer and the external electrode. In addition, it has also been successfully confirmed that the ESR fluctuation (ESR_CV) is able to be reduced or prevented by providing the thin film electrode layer and/or the resistive electrode layer in the planes (that is, only on the end surfaces) of the laminated body when forming the external electrodes with resistance.

It is to be noted that while the thin film electrode layers were formed by the plating method according to Examples 1 to 3, it has been confirmed that even when the thin film electrode layers are formed by sputtering and vapor deposition, the effect of reducing the ESL and reducing or preventing the fluctuation in ESR is similar to the case of the plating method. Furthermore, it has been confirmed that even when the thickness of the thin film electrode layer is changed from about 2 μm to each of about 0.5 μm and about 9 μm, for example, the effect of reducing the ESL and reducing or preventing the fluctuation in ESR is similar to the case of Examples 1 to 3 (in the case of about 2 μm in thickness).

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
   a substantially cuboid laminated body including a plurality of ceramic layers and a plurality of internal electrode layers that are laminated, and two or more exposed regions at which the plurality of internal electrode layers are exposed; and
   external electrodes which cover the exposed regions; wherein
   at least two of the external electrodes are external electrodes with resistance;
   at least one of the external electrodes is a low-resistance external electrode;
   the internal electrode layers include a first internal electrode layer and a second internal electrode layer opposed to the first internal electrode layer in the lamination direction;
   each of the external electrodes with resistance includes:
      a thin film electrode layer in direct contact with the internal electrode layer in the exposed region;
      a resistive electrode layer provided on the thin film electrode layer; and
      an upper electrode layer provided directly on the resistive electrode layer, the upper electrode layer having a lower electrical resistivity than the resistive electrode layer; and
   a distance from a side surface of the laminated body to the thin film electrode layer is about ⅓ or more of a distance from the side surface of the laminated body to the internal electrode layers.

2. The multilayer ceramic capacitor according to claim 1, wherein the thin film electrode layer is disposed within a plane in which the exposed region is located at the laminated body.

3. The multilayer ceramic capacitor according to claim 1, wherein the resistive electrode layer is disposed within a plane in which the exposed region is located at the laminated body.

4. The multilayer ceramic capacitor according to claim 1, wherein
   the laminated body includes a first end surface and a second end surface opposed to the first end surface, and a first side surface and a second side surface orthogonal or substantially orthogonal to the first end surface and the second end surface and opposed to each other;
   the side surface of the laminated body includes one of the first side surface and the second side surface;
   the first internal electrode layer is exposed at the first end surface and the second end surface;
   the second internal electrode layer is exposed at the first side surface and the second side surface; and
   the external electrode covering the exposed regions at which the first internal electrode layer is exposed at the first end surface and the second end surface is one of the external electrodes with resistance.

5. The multilayer ceramic capacitor according to claim 4, wherein the external electrode covering the exposed regions at which the second internal electrode layer is exposed at the first side surface and the second side surface is the low-resistance external electrode.

6. The multilayer ceramic capacitor according to claim 1, wherein the thin film electrode layer is a plating electrode.

7. The multilayer ceramic capacitor according to claim 1, wherein the thin film electrode layer includes at least one metal selected from the group consisting of Cu, Ni, Ag, Pd, an Ag—Pd alloy and Au.

8. The multilayer ceramic capacitor according to claim 1, wherein the thin film electrode layer contains no glass and has a content ratio of metal per unit volume of the thin film electrode layer is about 99 vol % or higher.

9. The multilayer ceramic capacitor according to claim 1, wherein a thickness of the thin film electrode layer is about 0.5 μm or more and about 9 μm or less.

10. The multilayer ceramic capacitor according to claim 1, wherein a thickness of the thin film electrode layer is about 1 μm or more and about 5 μm or less.

11. The multilayer ceramic capacitor according to claim 1, wherein a thickness of the thin film electrode layer is about 2 μm or more and about 3 μm or less.

12. The multilayer ceramic capacitor according to claim 1, wherein the distance from the side surface of the laminated body to the thin film electrode layer is about ½ or more of the distance from the side surface of the laminated body to the internal electrode layers.

13. The multilayer ceramic capacitor according to claim 12, wherein the distance from the side surface of the laminated body to the thin film electrode layer is about 9/10 or more of the distance from the side surface of the laminated body to the internal electrode layers.

* * * * *